US009996605B2

(12) United States Patent
Charron et al.

(10) Patent No.: US 9,996,605 B2
(45) Date of Patent: Jun. 12, 2018

(54) MANAGING DATA WITHIN A TEMPORAL RELATIONAL DATABASE MANAGEMENT SYSTEM

(71) Applicant: International Business Machines Corporation, Armonk, NY (US)

(72) Inventors: David S. Charron, Rochester, MN (US); Kyle E. Gilbertson, Rochester, MN (US); Rafal P. Konik, Oronoco, MN (US); Nicholas T. Lawrence, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 14/852,511

(22) Filed: Sep. 12, 2015

(65) Prior Publication Data
US 2017/0075975 A1 Mar. 16, 2017

(51) Int. Cl.
*G06F 17/30* (2006.01)

(52) U.S. Cl.
CPC .. *G06F 17/30598* (2013.01); *G06F 17/30292* (2013.01); *G06F 17/30339* (2013.01); *G06F 17/30345* (2013.01); *G06F 17/30551* (2013.01)

(58) Field of Classification Search
CPC ......... G06F 17/30598; G06F 17/30463; G06F 17/30371; G06F 17/30466; G06F 17/30377; G06F 17/30469; G06F 17/30477; G06F 17/30498; G06F 17/30876; G06F 17/30345; G06F 17/30445; G06F 17/30864; G06F 17/30867; G06F 17/30958
See application file for complete search history.

(56) References Cited

U.S. PATENT DOCUMENTS

| | | | |
|---|---|---|---|
| 5,948,040 A * | 9/1999 | DeLorme | G01C 21/36 340/990 |
| 6,691,097 B1 | 2/2004 | Saracco | |
| 7,379,880 B1 * | 5/2008 | Pathria | G06Q 30/0603 705/1.1 |
| 7,434,229 B2 | 10/2008 | Barinov et al. | |
| 7,904,434 B2 | 3/2011 | Yalamanchi et al. | |
| 9,367,872 B1 * | 6/2016 | Visbal | G06Q 40/00 |
| 2006/0085456 A1 * | 4/2006 | Pickering | G06F 17/30309 |
| 2008/0140629 A1 * | 6/2008 | Porter | G06F 17/30551 |
| 2008/0147603 A1 * | 6/2008 | Kostamaa | G06F 7/10 |

(Continued)

OTHER PUBLICATIONS

Sharron et al., "Managing Data Within a Temporal Relational Database Management System", U.S. Appl. No. 15/075,172, filed Mar. 20, 2016.

(Continued)

*Primary Examiner* — Dung K Chau
(74) *Attorney, Agent, or Firm* — Nicholas D. Bowman

(57) ABSTRACT

Disclosed aspects include a temporal relational database management system initiating a set of operations. A set of columns in a transaction time temporal table is identified for change categorization. A change categorization model is constructed. The change categorization model is based on a set of changes with respect to the set of columns in the transaction time temporal table. The change categorization model uses a cluster analysis technique. Based on the change categorization model, a group of change categories for a set of rows coupled with the set of columns in the transaction time temporal table is determined. Based on the change categorization model, a first change category of the group of change categories is established in a first row of the set of rows.

16 Claims, 11 Drawing Sheets

(56) References Cited

U.S. PATENT DOCUMENTS

| | | | |
|---|---|---|---|
| 2009/0248638 A1 | 10/2009 | Hughes | |
| 2012/0191682 A1 | 7/2012 | Banerjee et al. | |
| 2013/0018849 A1* | 1/2013 | Johnston | G06F 17/30309 707/687 |
| 2015/0046413 A1 | 2/2015 | Andrei et al. | |
| 2015/0088856 A1* | 3/2015 | Hunter | G06F 17/30466 707/714 |
| 2016/0344758 A1* | 11/2016 | Cohen | G06F 3/04842 |

OTHER PUBLICATIONS

List of IBM Patents or Patent Applications Treated as Related.

Anonymously; "Obtaining a subset of the database state that would determine the outcome of its execution for a given sequence of SQL statements to be run on a RDBMS database, by using a proxy JDBC(TM) driver"; An IP.com Prior Art Database Technical Disclosure; IP.com No. 000226538; Apr. 15, 2013.

Anonymously; "Smart system for Optimal Logging with Intelligent Row Format"; An IP.com Prior Art Database Technical Disclosure; IP.com No. 000225772; Mar. 5, 2013.

Agrawal, et al.; "Mining Association Rules between Sets of Items in Large Databases"; IBM Almaden Research Center; SIGMOD '93 Proceedings of the 1993 ACM SIGMOD international conference on Management of data; pp. 207-216.

Wikimedia Foundation, Inc.; WikiPedia; Association rule learning; <https://en.wikipedia.org/wiki/Association_rule_learning>.

Alvarez et al., "Artificial Intelligence in Medicine", vol. 58, Issue 3, Jul. 2013, 2 pages, Abstract Only.

Scepi, G., "Clustering Algorithms for Large Temporal Data Sets", Data Analysis and Classification, 2010, pp. 369, 371-374, and 377.

* cited by examiner

700

| Key_col (common value to both tables) | Table_1 Deltas | | | Table_2 Deltas | | Table_2 row id |
|---|---|---|---|---|---|---|
| | Delta_1 | Delta_2 | Delta_3 | Delta_A | Delta_B | |
| A | Some Value X | Some Value Y | Some Value Z | Some Value A | Some Value B | 1 |
| A | Same Value X for all key_col = 'A' in the transaction | Same Value Y for all key_col = 'A' in the transaction | Same Value Z for all key_col = 'A' in the transaction | Some Value C | Some Value D | 2 |

910 Database that tracks auto insurance policies (with transaction time temporal support):

| ID | VIN | Coverage Amount | Annual Miles | Number of Tickets | Row Begin | Row End | session User | Operation Type |
|---|---|---|---|---|---|---|---|---|
| 1 | 1234 | 500000 | 100000 | 0 | 2015-01-02 | 9999-12-30 | Insurance_Agent | INSERT |

930 Current rows:

| ID | VIN | Coverage Amount | Annual Miles | Number of Tickets | Row Begin | Row End | session User | Operation Type |
|---|---|---|---|---|---|---|---|---|
| 1 | 1234 | 750000 | 50000 | 1 | 2015-07-01 | 9999-12-30 | user-online-id | UPDATE |

950 Historical versions of rows:

| ID | VIN | Coverage Amount | Annual Miles | Number of Tickets | Row Begin | Row End | Session User | Operation Type |
|---|---|---|---|---|---|---|---|---|
| 1 | 1234 | 450000 | 50000 | 1 | 2015-06-01 | 2015-07-01 | Insurance_Auditor | UPDATE |
| 1 | 1234 | 450000 | 50000 | 0 | 2015-04-01 | 2015-06-01 | Insurance_Agent | UPDATE |
| 1 | 1234 | 500000 | 100000 | 0 | 2015-01-02 | 2015-04-01 | Insurance_Agent | INSERT |

990

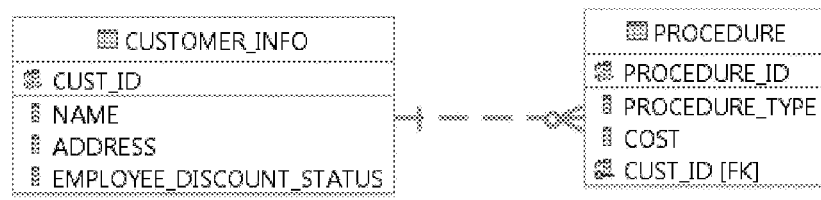

| ID | VIN | Coverage Amount | Annual Miles | Number of Tickets | Row Begin | Row End | Session User | Operation Type | Update category |
|---|---|---|---|---|---|---|---|---|---|
| 1 | 1234 | 750000 | 50000 | 1 | 2015-07-01 | 9999-12-30 | ONLINE | UPDATE | 1 |

1050

| ID | VIN | Coverage Amount | Annual Miles | Number of Tickets | Row Begin | Row End | Session User | Operation Type | Update category |
|---|---|---|---|---|---|---|---|---|---|
| 1 | 1234 | 450000 | 50000 | 1 | 2015-06-01 | 2015-07-01 | Insurance_A uditor | UPDATE | 2 |
| 1 | 1234 | 450000 | 50000 | 0 | 2015-04-01 | 2015-06-01 | Insurance_A gent | UPDATE | 1 |
| 1 | 1234 | 500000 | 100000 | 0 | 2015-01-02 | 2015-04-01 | Insurance_A gent | INSERT | 3 |

1070

| Learned Category | Label |
|---|---|
| 1 | Minor Change in Terms |
| 2 | Added Ticket |
| 3 | New standard policy added |

1112 Current Data in CUSTOMER_INFO

| Row-begin | Row-end | Transaction id | Cust_id | name | address | Employee discount status |
|---|---|---|---|---|---|---|
| 01-15-2015 | 9999-12-30 | 2 | 1 | Nick | Rochester | N |

1114 Current Data in PROCEDURE

| Row-begin | Row-end | Transaction ID | Cust_id | Procedure_id | procedure_type | cost | operation type | Category |
|---|---|---|---|---|---|---|---|---|
| 01-15-2014 | 9999-12-30 | 2 | 1 | 1 | Exam | 200 | UPDATE | 1 |
| 01-15-2014 | 9999-12-30 | 2 | 1 | 2 | Cancer Screening | 250 | UPDATE | 1 |
| 01-30-2015 | 9999-12-30 | 3 | 1 | 3 | Check-up | 75 | INSERT | 2 |

1152 Historical rows in CUSTOMER_INFO

| Row-begin | Row-end | Transaction id | Cust_id | name | address | Employee discount status |
|---|---|---|---|---|---|---|
| 01-01-2015 | 01-15-2015 | 1 | 1 | Nick | Rochester | Y |

1154 Historical rows in PROCEDURE

| Row-begin | Row-end | Transaction id | Cust_id | Procedure_id | procedure_type | cost | operation type | category |
|---|---|---|---|---|---|---|---|---|
| 01-01-2015 | 01-15-2014 | 1 | 1 | 1 | Exam | 100 | INSERT | 3 |
| 01-01-2015 | 01-15-2014 | 1 | 1 | 2 | Cancer Screening | 125 | INSERT | 3 |

1170

| Learned Category | Label |
|---|---|
| 1 | Update to procedure due to a change in employee discount status in CUSTOMER_INFO |
| 2 | New row added for an existing customer |
| 3 | New row added for a new customer |

FIG. 11

MANAGING DATA WITHIN A TEMPORAL RELATIONAL DATABASE MANAGEMENT SYSTEM

BACKGROUND

This disclosure relates generally to database management systems and, more particularly, relates to temporal relational database management systems. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure extend the capabilities of a temporal relational database system so that versions of rows include not only the state of the system when that version of the row came into existence, but also a learned category of the change. The learned category may be learned in a dynamic, automatic, or unsupervised manner. As such, aspects described herein merge transaction/system time temporal database features with machine learning techniques to provide a user with high-level information about the types of changes that are occurring in a relational database system (RDMS).

Aspects of the disclosure include a temporal relational database management system initiating a set of operations. A set of columns in a transaction time temporal table is identified for change categorization. A change categorization model is constructed. The change categorization model is based on a set of changes with respect to the set of columns in the transaction time temporal table. The change categorization model uses a cluster analysis technique. Based on the change categorization model, a group of change categories for a set of rows coupled with the set of columns in the transaction time temporal table is determined. Based on the change categorization model, a first change category of the group of change categories is established in a first row of the set of rows.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 shows an example delta image according to embodiments.

FIG. 9 depicts a diagram illustrating features of an example temporal relational database management system according to embodiments.

FIG. 10 depicts a diagram illustrating features of an example temporal relational database management system according to embodiments.

FIG. 11 depicts a diagram illustrating features of an example temporal relational database management system having multiple tables according to embodiments.

Figure 1:
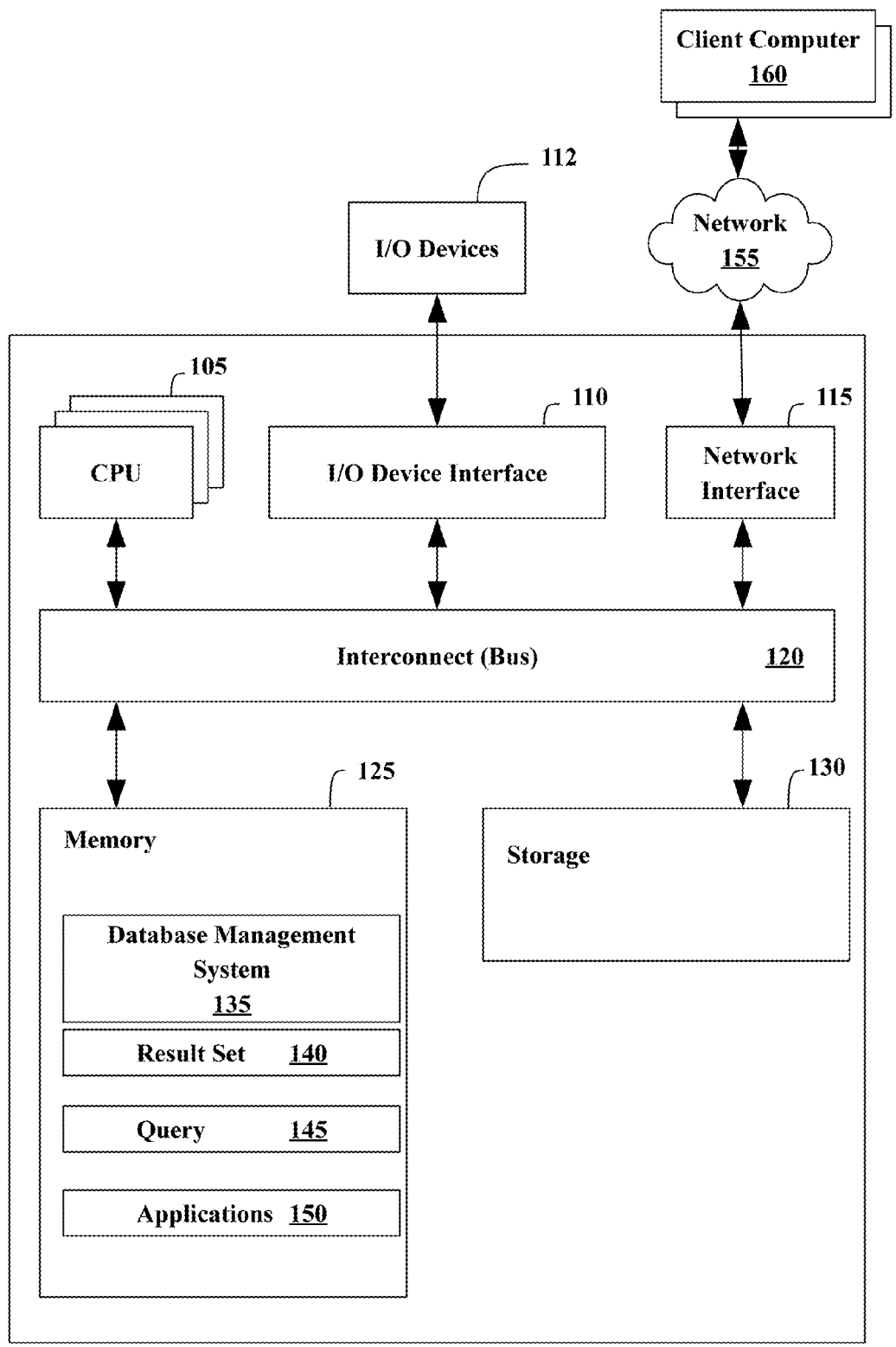
FIG. 1 illustrates an example representation of a computer system connected to a client computer via a network according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure extend the capabilities of a temporal relational database system so that versions of rows include not only the state of the system when that version of the row came into existence, but also a learned category of the change. The learned category may be learned in a dynamic, automatic, or unsupervised manner. As such, aspects described herein merge transaction/system time temporal database features with (unsupervised) machine learning techniques to provide a user (e.g., business analyst/auditor) with high-level information about the types of changes that are occurring in a relational database system (RDMS).

Support for temporal transaction time capabilities in a database can be useful for auditing decisions by enabling the database to answer questions such as what data was in the database at a previous point in time, what rows would have been returned from a query at a previous point in time, or what versions of a row previously existed. How a version of a row came into existence can be useful with respect to features such as a specific data change operation (e.g., insert, update), session user, application name, etc. Aspects of the disclosure may go beyond recording the state of the system when a version of a row came into existence by providing a configuration which summarizes the type(s) of changes that are occurring in the database or presenting insight into why the changes were made. Disclosed aspects include the database learning (e.g., in an unsupervised manner) a finite number of categories for data change operations, using changes that have already occurred as a training set, and classifying a new version of a row as a particular type of change. In certain embodiments, the learned categories may be subsequently identified/labeled with an identifier/label by a user.

Aspects of the disclosure include a method, system, and computer program product for managing data within a temporal relational database management system. The temporal relational database management system can initiate a set of operations. A set of columns (e.g., a set of numerical values, a set of free text, a set of unstructured data) in a transaction time temporal table is identified for change categorization. A change categorization model is constructed. The change categorization model is based on a set of changes with respect to the set of columns in the transaction time temporal table. The change categorization model uses a cluster analysis technique. Based on the change categorization model, a group of change categories (for a set of rows coupled with the set of columns in the transaction time temporal table) is determined. A first change category of the group of change categories is established (based on the change categorization model) in a first row of the set of rows.

In embodiments, a change request for a second row of the set of rows is received. Based on the change categorization model, a second change category of the group of change categories can be established in the second row of the set of rows. In embodiments, a request for a new row which is coupled with the set of columns in the transaction time temporal table is received. Based on the change categorization model, a second change category of the group of change categories can be established in the new row.

In various embodiments, a set of delta images may be computed based on the set of changes with respect to the set of columns in the transaction time temporal table. The set of delta images can include a magnitude of change for the set of columns. In certain embodiments, the set of delta images is normalized using a statistical analysis technique or is cached in the temporal relational database management system.

In embodiments, the cluster analysis technique includes a k-means technique or a singular value decomposition (SVD) technique. In various embodiments, a set of clusters is generated using the cluster analysis technique. The set of clusters can be based on the set of changes with respect to the set of columns in the transaction time temporal table. Based on the set of clusters, the set of rows may be mapped to the group of change categories. Aspects of the disclosure may provide performance or efficiency benefits for managing data within a temporal relational database management system (e.g., speed, flexibility, responsiveness, resource usage, productivity). Aspects may save resources such as bandwidth, processing, or memory.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
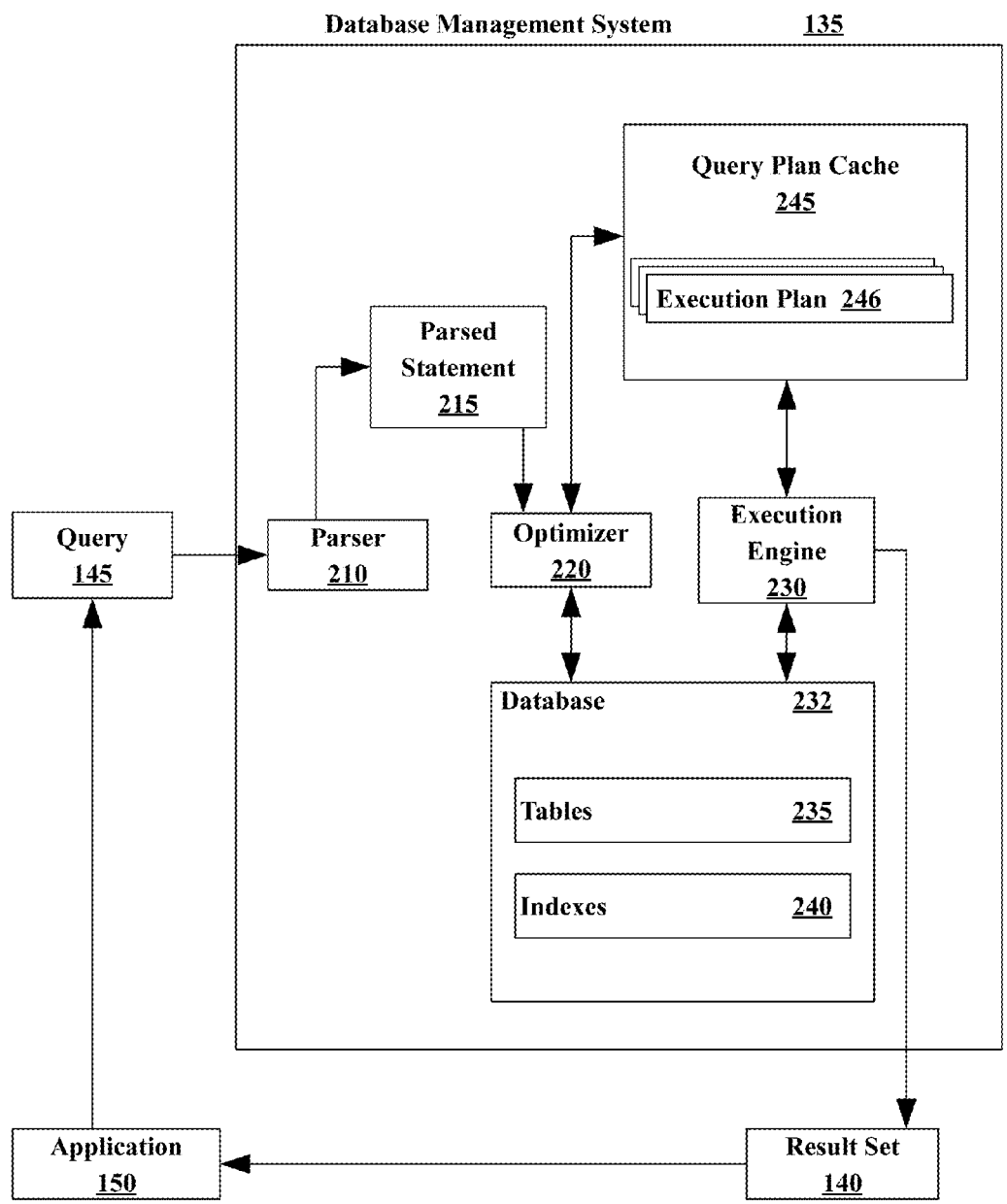
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

As mentioned herein, the optimizer 220 creates the query access plan. The optimizer 220 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 3:
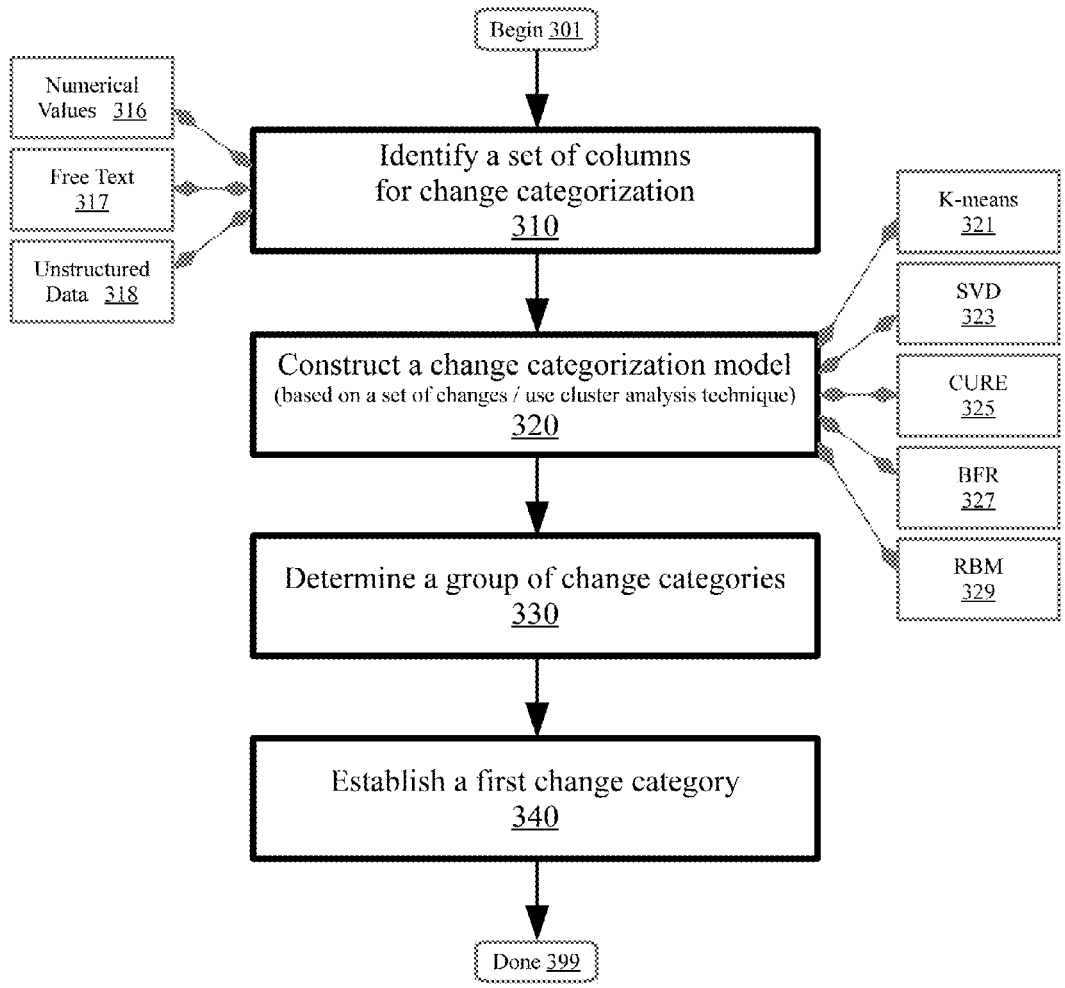
FIG. 3 is a flowchart illustrating a method for managing data within a temporal relational database management system according to embodiments.

FIG. 3 is a flowchart illustrating a method 300 for managing data within a temporal relational database management system according to embodiments. The temporal relational database management system can have built-in support for handling data involving time. Temporal aspects may include valid time or transaction time. Valid time can include the time period during which a fact is true with respect to the real world. Transaction time can include the time period during which a fact stored in the database is considered to be true. Transaction time may record the time period during which a database entry is accepted as correct. This enables queries that can present or show the state of the database at a given time. Method 300 may begin at block 301.

At block 310, the temporal relational database management system may identify a set of columns in a transaction time temporal table for the functional purpose of change categorization. Change categorization can be similar to or the same as classifying or sorting with respect to modifications, updates, or alterations. The transaction time temporal table can include data related to temporal aspects such as transaction time. Identifying may include ascertaining, sensing, scanning, analyzing, or recognizing. In embodiments, the set of columns may be considered candidates for management using the techniques described herein based on a type of data the set of columns includes (e.g., integer data, dollar amounts, distances, forms of measurement). The set of columns can include a set of numerical values (e.g., integers, decimals, fractions) at block 316, a set of free text (e.g., a string/sequence of symbols/characters/words) at block 317, or a set of unstructured data (e.g., data without predefined characteristics) at block 318. For instance, columns having unstructured data (e.g., free text, graphical) data can be converted to a fixed length vector of numeric features.

At block 320, the temporal relational database management system may construct a change categorization model. Constructing can include structuring, creating, establishing, generating, or forming. The change categorization model can be based on a set of changes (e.g., modifications, updates, alterations, additions, subtractions) with respect to (e.g., within) the set of columns in the transaction time temporal table. A cluster analysis technique may be used to construct the change categorization model. The cluster analysis technique may group the set of changes by similarity. In embodiments, the cluster analysis technique can include a k-means technique at block 321, a singular value decomposition (SVD) technique at block 323, a clustering using representatives (CURE) technique at block 325, a Bradley-Fayyad-Reina (BFR) technique at block 327, or a restricted Boltzmann machine (RBM) neural network technique at block 329. In certain embodiments, the cluster analysis technique may be selected by a user, predetermined, based on historical information, or randomly chosen. Clustering may include a bunch of data with small distances among the cluster members, dense areas of a data space, intervals, or particular statistical distributions. Such techniques are illustrative and may include modifications or equivalencies based on the techniques listed. As such, data in a certain column may be analyzed and clumped as a precursor for one or more change categories/classifications/groupings.

At block 330, the temporal relational database management system determines a group of change categories for a set of rows coupled with the set of columns (e.g., one or more cells) in the transaction time temporal table. The determination may be based on the change categorization model (e.g., cluster analysis of data with temporal changes). Determining can include resolving, ascertaining, computing, formulating, analyzing, identifying, or evaluating. The group of change categories may be applied to those row/column couplings (e.g., cells) which meet a particular criterion (e.g., with respect to the change categorization model). As such, a clumping of similar data values (e.g., relative nearness in measurement) in a column may form a basis for a change category.

At block 340, the temporal relational database management system establishes a first change category of the group of change categories in a first row of the set of rows. Establishment may occur based on the change categorization model. Establishing can include creating, generating, outputting, forming, writing, or providing. The first change category may have an identification for a cluster-analysis-based clumping of which it identifies, represents, or symbolizes. As such, an identifier for the first change category may be written into a cell as a representative value. The first change category can apply to the first row as a whole to provide a user, administrator, or algorithm with high-level information regarding one or more changes related to the first row.

Method 300 concludes at block 399. Aspects of method 300 may provide performance or efficiency benefits with respect to managing data within a temporal relational database management system. For example, aspects of method 300 may include positive impacts on resource usage (e.g., memory) or speed (e.g., processing) by summarizing changes within the transaction time temporal table. In embodiments, performance or efficiency benefits when auditing a grouping of data at a given period of time or processing a query using a temporal relational database management system may occur (e.g., flexibility, responsiveness, productivity).

Figure 4:
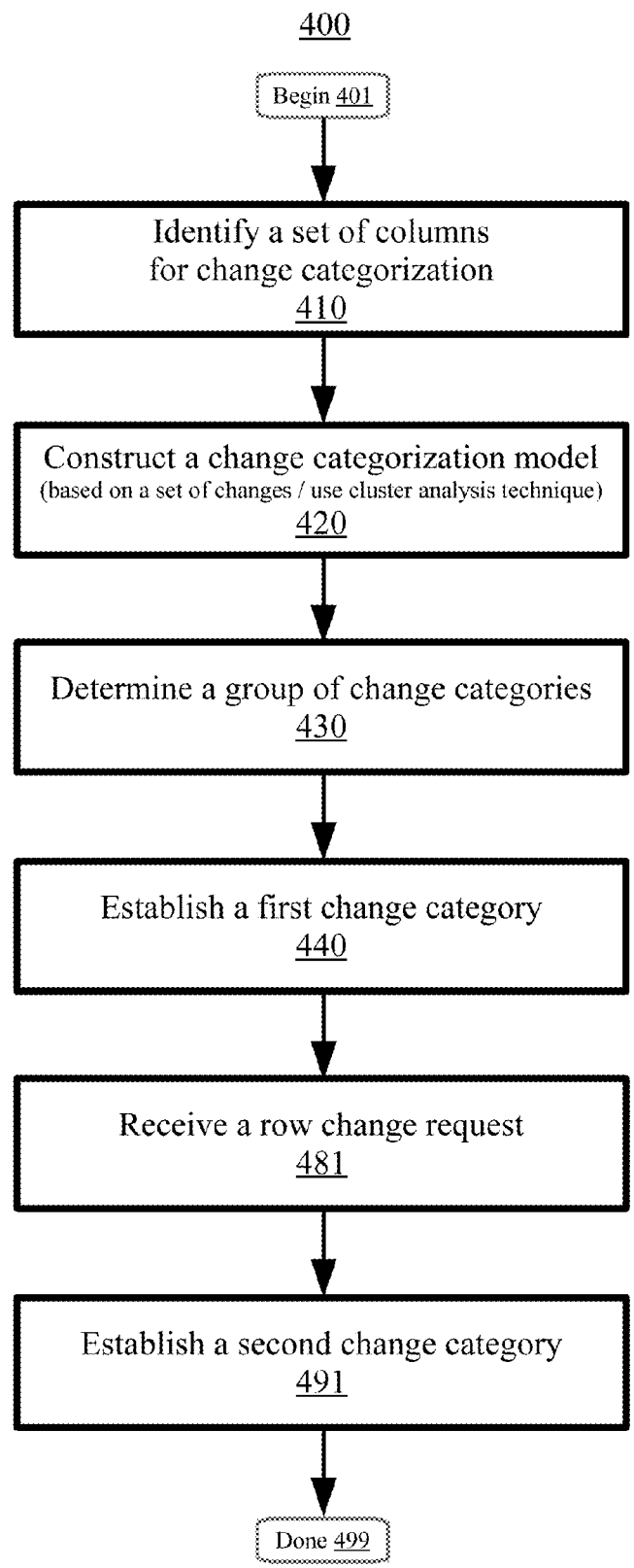
FIG. 4 is a flowchart illustrating a method for managing data within a temporal relational database management system according to embodiments.

FIG. 4 is a flowchart illustrating a method 400 for managing data within a temporal relational database management system according to embodiments. Method 400 may include aspects of method 300. Method 400 may begin at block 401. At block 410, the temporal relational database management system may identify a set of columns in a transaction time temporal table for the functional purpose of change categorization. At block 420, the temporal relational database management system may construct a change categorization model. At block 430, the temporal relational database management system determines a group of change categories for a set of rows coupled with the set of columns in the transaction time temporal table. At block 440, the temporal relational database management system establishes a first change category of the group of change categories in a first row of the set of rows.

At block 481, the temporal relational database management system receives a change request for a second row of the set of rows. The second row may be already existing/present. As such, the change request may be an update (e.g., changing a cell from a first value to a second value). Receiving may include detecting (e.g., detecting an input from a user) or sensing (e.g., sensing a trigger in a data packet). In embodiments, the change request is received in response to determining the group of change categories. In embodiments, the group of change categories is determined in response to receiving the change request.

At block 491, the temporal relational database management system establishes a second change category of the group of change categories in a second row of the set of rows (e.g., in response to receiving the change request). The second change category can be different from the first change category. Establishment may occur based on the change categorization model. Establishing can include determining, identifying, resolving, creating, generating, outputting, forming, writing, or providing. The second change category may have an identification for a cluster-analysis-based clumping of which it identifies, represents, or symbolizes. As such, an identifier for the second change category may be written into a cell as a representative value. The second change category can apply to the second row as a whole to provide a user, administrator, or algorithm with high-level information regarding one or more changes related to the second row. Thus, a plurality of (distinct) change categories may be established in a given column. Comparatively, the first and second rows may thus indicate distinct/different types of changes. Method 400 concludes at block 499.

Figure 5:
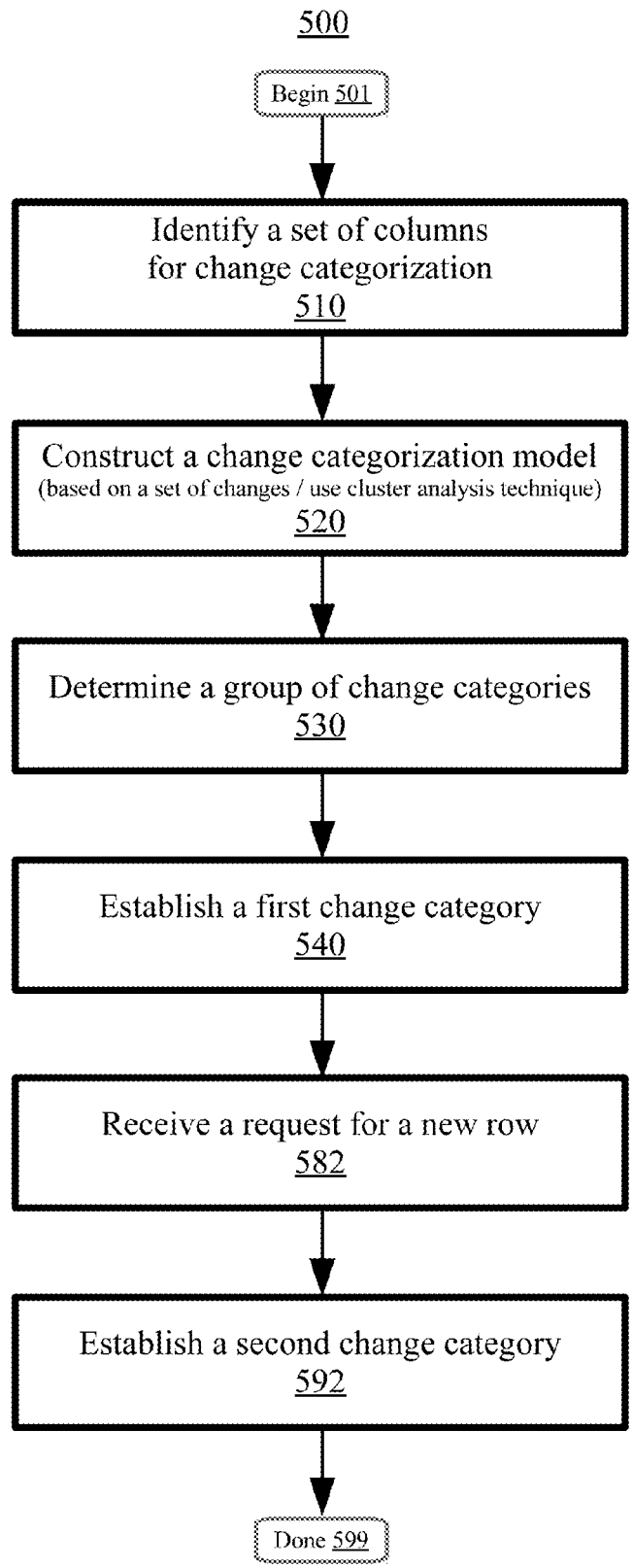
FIG. 5 is a flowchart illustrating a method for managing data within a temporal relational database management system according to embodiments.

FIG. 5 is a flowchart illustrating a method 500 for managing data within a temporal relational database management system according to embodiments. Method 500 may include aspects of method 300. Method 500 may begin at block 501. At block 510, the temporal relational database management system may identify a set of columns in a transaction time temporal table for the functional purpose of change categorization. At block 520, the temporal relational database management system may construct a change categorization model. At block 530, the temporal relational database management system determines a group of change categories for a set of rows coupled with the set of columns in the transaction time temporal table. At block 540, the temporal relational database management system establishes a first change category of the group of change categories in a first row of the set of rows.

At block 582, the temporal relational database management system receives a request for a new row (e.g., insert operation) which is coupled with the set of columns in the transaction time temporal table. The second row may be previously nonexistent or have null values (or the like). As such, the request for the new row (e.g., adding a row of data) may be different from a change request. Receiving may include detecting (e.g., detecting an input from a user) or sensing (e.g., sensing a trigger in a data packet). In embodiments, the request for the new row is received in response to determining the group of change categories. In embodiments, the group of change categories is determined in response to receiving the request for the new row.

At block 592, the temporal relational database management system establishes a second change category of the group of change categories in a new row (e.g., in response to receiving the change request). The second change category can be different from the first change category. Establishment may occur based on the change categorization model. Establishing can include determining, identifying, resolving, creating, generating, outputting, forming, writing, or providing. The second change category may have an identification for a cluster-analysis-based clumping of which it identifies, represents, or symbolizes. As such, an identifier for the second change category may be written into a cell as a representative value. The second change category can apply to the new row as a whole to provide a user, administrator, or algorithm with high-level information regarding one or more values related to the new row. Thus, a plurality of (distinct) change categories may be established in a given column. Comparatively, the first and new rows may thus indicate distinct/different types of modifications. Method 500 concludes at block 599.

Figure 6:
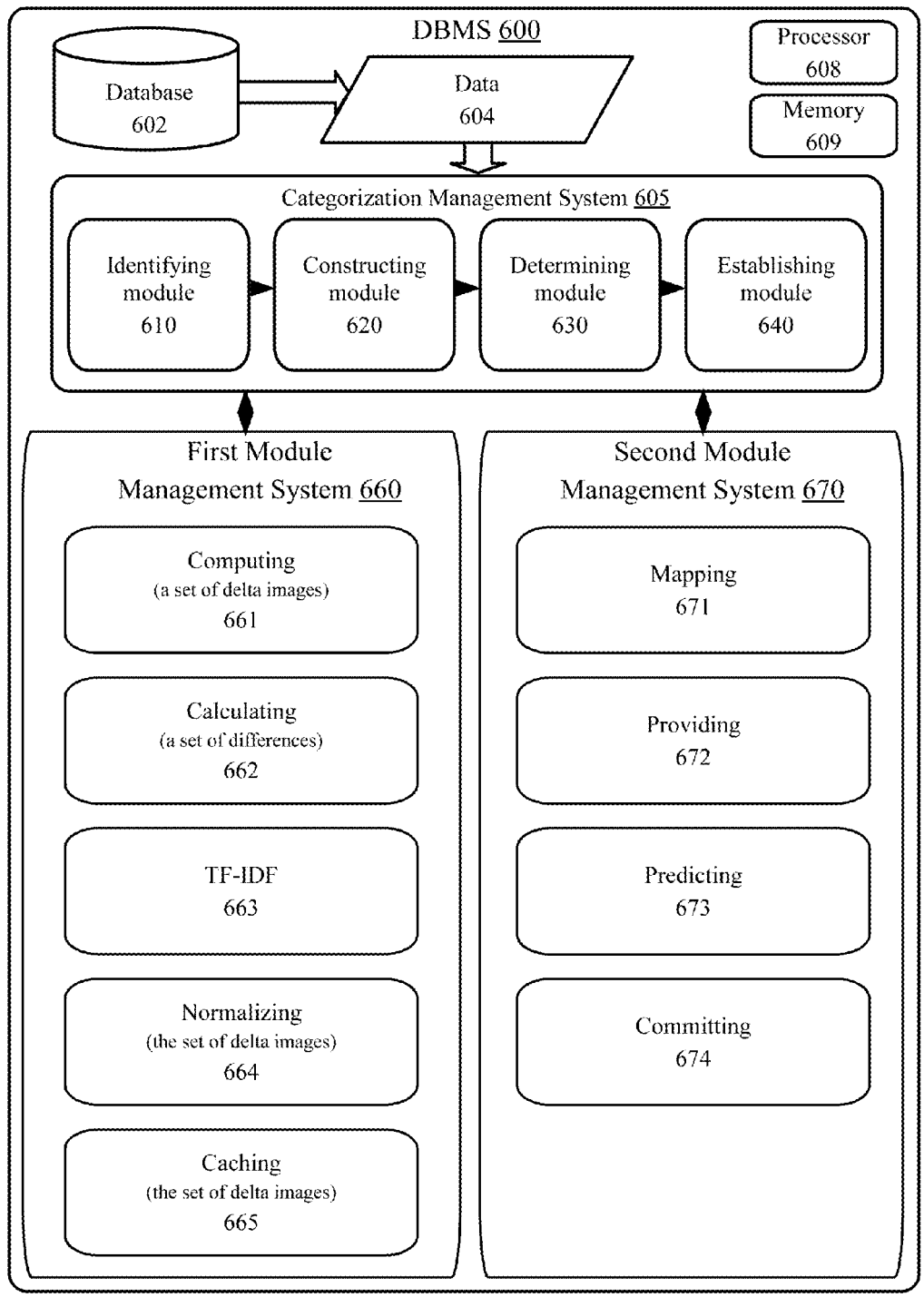
FIG. 6 shows an example system for managing data within a temporal relational database management system according to embodiments.

FIG. 6 shows an example system 600 for managing data within a temporal relational database management system according to embodiments. The example system 600 may illustrate a database management system (DBMS). The example system 600 includes a (computer/hardware) processor 608 and a memory 609. The example system 600 has a database 602 and has data 604. The data 604 may be used for operation(s) with respect to aspects described herein including methods 300/400/500 and the example system 400.

The example system 600 can include a categorization management system 405. The categorization management system 605 may include an identifying module 610 (see e.g., description with respect to block 310 of FIG. 3), a constructing module 620 (see e.g., description with respect to block 320 of FIG. 3), a determining module 630 (see e.g., description with respect to block 330 of FIG. 3), and an establishing module 640 (see e.g., description with respect to block 340 of FIG. 3). As such, the example system 600 may implement aspects of methods 300/400/500. In embodiments, other aspects may be included.

In embodiments, the example system 600 includes a first module management system 660 (e.g., to train the change categorization model). The first module management system 660 may have a computing module 661, a calculating module 662, a TF-IDF module 663, a normalizing module 664, and a caching module 665. At computing module 661, a set of delta images may be computed. The set of delta images can be based on the set of changes with respect to the set of columns in the transaction time temporal table. Accordingly, the set of delta images may include a magnitude/ratio/significance of change for the set of columns (e.g., a first/historical value for a characteristic at a first time relative to a second/current value for the characteristic at a second time). Computing may include comparing a first value with a second value. In general, the values can be of the same type (e.g., numerical, free text). As such, various comparison techniques may be utilized (e.g., arithmetic, mathematical, natural language processing). To illustrate how cognitive computing may be utilized, a value may start as "red" and end as "purple." As such, cognitive computing techniques may be utilized to determine an "addition of blue" as the change.

In certain embodiments, a set of differences is calculated at the calculating module 662. The set of differences may be calculated based on the set of changes with respect to the set of columns in the transaction time temporal table. The set of differences can include at least one of a mathematical difference (e.g., arithmetic, subtraction) or a statistical difference (e.g., percentage, standard deviation). For example, a change from a value of 1000 bushels to 900 bushels may be a mathematical difference of 100 bushels or a statistical difference of negative 10% of the original.

In various embodiments, the set of columns can be transformed/translated into a term vector of term frequency-inverse document frequency (TF-IDF) weights utilizing the TF-IDF module 663. Accordingly, the term vector of term frequency-inverse document frequency (TF-IDF) weights may be used by the TF-IDF module 663 to compute the set of delta images. TF-IDF may be a numerical statistic which reflects relative importance of data (e.g., a word) in a document/corpus/dataset (e.g., a particular dataset) with respect to a profile document/corpus/dataset (e.g., overall collection of datasets). As such, TF-IDF can be used as a weighting factor. For instance, a TF-IDF value increases in proportion to the number of times a word appears in the document/corpus/dataset, but may be offset by the frequency of the word in the profile document/corpus/dataset.

The set of delta images may be normalized utilizing the normalizing module 664. The normalizing module 664 may use a statistical analysis technique. For instance, a number of standard deviations from the mean may be calculated for each delta value. Outliers may be discarded such that a threshold percentage of data is used when normalizing (e.g., 90%). Frequently present/appearing values may be weighted differently from rarely present/appearing values. In embodiments, the set of delta images is cached in the temporal relational database management system using the caching module 665. For example the set of delta images/values could be retained a Materialized Query Table or the like (e.g., with information that could be used to speed up training or retaining of the model). An embodiment that utilized the BFR algorithm could be maintained online if the number of values per category, and for each column/category $SUM(x)$ and $SUM(x^2)$ were available.

In embodiments, the example system 600 includes a second module management system 670. The first module management system 670 may have a mapping module 671, a providing module 672, a predicting module 673, and a committing module 674. The mapping module 671 may generate a set of clusters (based on the set of changes with respect to the set of columns in the transaction time temporal table). The set of clusters may be generated using the cluster analysis technique (e.g., in response to constructing the change categorization model). Based on the set of clusters, the mapping module 671 can map the set of rows to the group of change categories. For instance, a row may be assigned one or more change categories. Alternatively, a change category may be assigned one or more rows. The mapping may be noted in a specific column/field of the row. In certain embodiments, dynamic (e.g., on-going, real-time) mapping may occur as the table is being updated.

In certain embodiments, the first change category (of the group of change categories in the first row of the set of rows) is provided (e.g., to a user, in response to a query) using the providing module 672. As such, the user may be presented information related to changes that have occurred in the transaction time temporal table of the temporal relational database management system. Accordingly, providing can include displaying (e.g., a high-level summary or detailed technical report). Providing can also include transmitting, sending, or otherwise conveying information for processing by another entity or computer (e.g., an encrypted/wrapped data packet).

In embodiments, a predicting module 673 may predict a change category of the group of change categories for a row of the set of rows. A change request which requests changes to a plurality of the set of columns may be received. Accordingly, the temporal relational database management system can predict the change category for the row at (or just prior to) transaction commit time. As such, a historical/existing row may be updated at (or just prior to) transaction commit time. Updating at transaction commit time may be different from statement-level operations, and transaction can involve multiple statements and multiple tables. Thus, computation may occur later (e.g., nearer to transaction commit time) using aspects describes herein relative to other methodologies.

In embodiments, the committing module 674 can relate to transaction commit time. For example, the transaction time temporal table may include both a first table and a second table. Accordingly, establishing the first change category of the group of change categories in the first row of the set of rows can include establishment in both the first and second tables. To illustrate, the first change category of the group of change categories may be established in a first row of a set of rows of the first table and a second change category of the group of change categories may be established in a first row of a set of rows of the second table. Thus, multiple tables may be used while waiting until transaction commit time to update data. In certain embodiments, a user may provide at least some Structured Query Language (SQL) syntax (or logic) to indicate how to compute features from versions of rows affected by a particular transaction.

FIG. 7 shows an example delta image 700 according to embodiments. The example delta image 700 may illustrate the use of multiple tables (see predicting module 673, committing module 674 or FIG. 6). Individual deltas may be derived/received from multiple tables. Table_1 and Table_2 can be related by a column Key_col in a 1-n relationship (i.e., 1 row in table_1 maps to n rows in Table_2). A "Type_Of_Change" column may be added to Table_2.

Aspects of the disclosure include generating the value for this column by using deltas from both tables, rather than just Table_2. As such, the delta image 700 may be utilized to calculate the type of change for Table_2.

For each changed row in Table_2, the related changes in Table_1 can be used to compute/predict a change category. The change category may be stored in a column of Table_2. Such a join of the deltas may not be available when Table_2 is changed because the order of changes may not be well defined. However, the information is available when the transaction commits (or completes). Thus, the calculation and assignment can be performed at or after (e.g., no earlier than) transaction commit time. Performance or efficiency benefits may result from being able to generate a value at commit time.

Figure 8:
FIG. 8 depicts a diagram illustrating potential benefits with respect to an example transaction time temporal table according to embodiments.

FIG. 8 depicts a diagram 800 illustrating potential benefits with respect to an example transaction time temporal table according to embodiments. A temporal relational database management system may have the ability to analyze previous versions of rows and state/status information association with those rows. Structured Query Language (SQL) expressions may be defined (and evaluated each time a version of a row is created) to identify a user who created the version of the row or a computer network address (e.g., Internet Protocol address) that the user connected from. State/status information related to temporal elements may provide valuable benefit if it provides general insights/rationale with respect to what is changing and why it is changing. Diagram 800 can illustrate aspects of the disclosure as described herein with respect to a banking example where a bank teller input the wrong amount during his initial creation but that was later corrected by a bank auditor. For instance, a magnitude of change (e.g., amount change by 10×), unchanged aspects (e.g., check image), user identification (e.g., username), and change categories (e.g., type of change) may be shown.

FIG. 9 depicts a diagram 900 illustrating features of an example temporal relational database management system according to embodiments. To illustrate aspects describe herein, a database may track auto insurance policies (with transaction time temporal support), see feature 910. For instance, a row may represent a policy for vehicle 1234. Next, the policy may undergo a number of changes. On 2015 Apr. 1, the policy is reduced by the insurance agent from 500000 to 450000 and the annual miles is reduced to 50000. On 2015 Jun. 1, an insurance auditor adds a ticket to the policy record. On 2015 Jul. 1, the customer increases the coverage amount to 750000 using an on-line service. Thus, the database with current versions of rows may be presented in a manner such as feature 930. Accordingly, the database with historical versions of rows may be presented in a manner such as feature 950.

A summary of what changes have occurred may be desirable. For example, a comprehensive database may have significantly more information about a customer that might change, such as number of driving age dependents, employment status, etc. Changes may be associated with other changes in the same transaction (e.g., add a dependent driver and add collision coverage to a policy at the same time). Disclosed aspects may provide performance or efficiency benefits by automatically classifying type(s) of changes into a category based on categorized types of changes that occur in the system.

In addition, multiple tables can sometimes be updated in the same transaction, as illustrated by feature 990. For example, assume that a medical database has a customer table that has a one to many relationship with a procedure table. Suppose one or more rows in the procedure table have had their cost increased in the same transaction as the employee discount status was changed. Summarizing these types of changes automatically and recording such information as a specific type/category of update in the procedure table may provide performance or efficiency benefits.

FIG. 10 depicts a diagram 1000 illustrating features of an example temporal relational database management system according to embodiments. To illustrate aspects describe herein, a database may track auto insurance policies (with transaction time temporal support) with current rows at feature 1010. As such, in addition to logging the user and operation type, a classification of the updates in from the description related to FIG. 9 can be logged at feature 1050. In embodiments, the category for each data change can be a numerical value for a category that is learned by the system. In certain embodiments, a user with domain knowledge may examine examples of a category and assign a meaningful phrase to each number (category) for improved understanding as illustrated by feature 1070.

Disclosed aspects may positively impact database operations when there are many columns or variability in the magnitude of the changes because many columns or variability can make it more difficult to categorize changes by user observation. Also, queries can be submitted such as "how many customers have made minor changes to their policies in the last year, vs major changes or no changes?" or "how many customers have made changes like this one?" If certain changes to the data imply a correction was made, having data/knowledge with respect to what types of corrections are most common may benefit a business process/audit. Accordingly, disclosed aspects may: learn categories from a training set of existing current/historical data, automatically categorize new versions of rows into a category, or update categories of historical rows when the change categorization model is retrained.

FIG. 11 depicts a diagram 1100 illustrating features of an example temporal relational database management system having multiple tables according to embodiments. To illustrate aspects describe herein, a database may track customer information with current rows at feature 1112 and procedure information with current rows at feature 1114. Historical rows are presented for customer information at feature 1152 and for procedure information at feature 1154. In certain embodiments, a user with domain knowledge may examine examples of a category and assign a meaningful phrase to each number (category) for improved understanding as illustrated by feature 1170.

Multiple tables (see feature 990 of FIG. 9) can desire/need changes in a related table to be considered when assigning a version of a row to a category. For example, consider the transactions that follow which are depicted in diagram 1100.

(TRANSACTION #1 on Jan. 1, 2015, add a customer that is an employee—that has two procedures performed)
INSERT INTO CUSTOMER_INFO (CUST_ID, NAME, ADDRESS, EMPLOYEE) VALUES (1, 'Nick', 'Rochester', 'Y')
INSERT INTO PROCEDURE (PROCEDURE_ID, CUST_ID, Procedure_Type, COST) VALUES (1, 1, 'Exam', 100)
INSERT INTO PROCEDURE (PROCEDURE_ID, CUST_ID, Procedure_Type, COST) VALUES (2, 1, 'Cancer Screening', 125)
COMMIT
(TRANSACTION #2 on Jan. 15, 2015, Remove employee status from customer, and increase the cost of procedure #1 and #2)

UPDATE CUSTOMER_INFO SET EMPLOYEE='N' WHERE CUST_ID=1
UPDATE PROCEDURE SET COST=COST*2 WHERE CUST_ID=1 AND
PROCEDURE_ID IN (1,2)
COMMIT
(TRANSACTION #3 on Jan. 30, 2015, The existing customer has a new procedure performed)
INSERT INTO PROCEDURE (PROCEDURE_ID, CUST_ID, Procedure_Type, COST) VALUES (3, 1, 'Check-up', 75)
COMMIT As illustrated, the category is also defined by rows (if they exist) in the CUSTOMER_INFO table that have the same transaction ID. Put differently, the category information can be assigned to the row when current versions of rows are committed, and also considers related changes using a joined view that involves more than one table (CUSTOMER_INFO and PROCEDURE). The categories may be learned by the system in an unsupervised manner, using existing versions of rows as training data.

With respect to a delete operation, there may be no current version of a row to assign a category to. An additional historical row can be recorded with generated values at the time of the delete operation. The additional historical row can be categorized as if the deleted version of the row is the prior version of the row, and the new version of the row has values of all zeros. Accordingly, new rows that are added to the database may be categorized as transactions are committed.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing data within a temporal relational database management system, the method comprising:
    identifying, by the temporal relational database management system, a set of columns in a transaction time temporal table for change categorization;
    constructing, by the temporal relational database management system, a change categorization model, wherein the change categorization model is based on a set of changes with respect to the set of columns in the transaction time temporal table and uses a cluster analysis technique;
    determining, by the temporal relational database management system based on the change categorization model, a group of change categories for a set of rows coupled with the set of columns in the transaction time temporal table; and
    establishing, by the temporal relational database management system based on the change categorization model, a first change category of the group of change categories in a first row of the set of rows.

2. The method of claim 1, further comprising:
receiving, by the temporal relational database management system, a change request for a second row of the set of rows; and
establishing, by the temporal relational database management system based on the change categorization model, a second change category of the group of change categories in the second row of the set of rows.

3. The method of claim 1, further comprising:
receiving, by the temporal relational database management system, a request for a new row which is coupled with the set of columns in the transaction time temporal table; and
establishing, by the temporal relational database management system based on the change categorization model, a second change category of the group of change categories in the new row.

4. The method of claim 1, wherein the set of columns includes a selection from a group consisting of at least one of: a set of numerical values, a set of free text, or a set of unstructured data.

5. The method of claim 1, further comprising:
computing a set of delta images based on the set of changes with respect to the set of columns in the transaction time temporal table, wherein the set of delta images includes a magnitude of change for the set of columns.

6. The method of claim 5, further comprising:
calculating a set of differences based on the set of changes with respect to the set of columns in the transaction time temporal table, wherein the set of differences include at least one of: a mathematical difference or a statistical difference.

7. The method of claim 5, further comprising:
transforming the set of columns into a term vector of term frequency-inverse document frequency (TF-IDF) weights; and
using the term vector of term frequency-inverse document frequency (TF-IDF) weights to compute the set of delta images.

8. The method of claim 5, further comprising:
normalizing the set of delta images using a statistical analysis technique.

9. The method of claim 5, further comprising:
caching the set of delta images in the temporal relational database management system.

10. The method of claim 1, wherein the cluster analysis technique groups the set of changes by similarity using a selection from a group consisting of at least one of: a k-means technique, a singular value decomposition (SVD) technique, a clustering using representatives (CURE) technique, a Bradley-Fayyad-Reina (BFR) technique, or a restricted Boltzmann machine (RBM) neural network technique.

11. The method of claim 1, further comprising:
generating, using the cluster analysis technique, a set of clusters based on the set of changes with respect to the set of columns in the transaction time temporal table; and
mapping, based on the set of clusters, the set of rows to the group of change categories.

12. The method of claim 1, further comprising:
providing to a user, by the temporal relational database management system, the first change category of the group of change categories in the first row of the set of rows.

13. The method of claim 1, further comprising:
predicting a change category of the group of change categories for a row of the set of rows; and
receiving a change request which requests changes to a plurality of the set of columns.

14. The method of claim 1, wherein the transaction time temporal table includes both a first table and a second table, and wherein establishing the first change category of the group of change categories in the first row of the set of rows includes:
establishing the first change category of the group of change categories in a first row of a set of rows of the first table, and establishing a second change category of the group of change categories in a first row of a set of rows of the second table.

15. The method of claim 1, further comprising:
computing a set of delta images based on the set of changes with respect to the set of columns in the transaction time temporal table, wherein the set of delta images includes a magnitude of change for the set of columns;
normalizing the set of delta images using a statistical analysis technique; and
caching the set of delta images in the temporal relational database management system.

16. The method of claim 1, further comprising:
generating, using the cluster analysis technique, a set of clusters based on the set of changes with respect to the set of columns in the transaction time temporal table;
mapping, based on the set of clusters, the set of rows to the set of change categories;
predicting a change category of the group of change categories for a row of the set of rows;
receiving a change request which requests changes to a plurality of the set of columns; and
providing to a user, by the temporal relational database management system, the first change category of the group of change categories in the first row of the set of rows.

* * * * *